United States Patent
Lee et al.

(10) Patent No.: US 10,003,439 B2
(45) Date of Patent: Jun. 19, 2018

(54) METHOD FOR TRANSMITTING UPLINK SIGNAL OF FALLBACK MODE IN WIRELESS COMMUNICATION SYSTEM THAT SUPPORTS CHANGE IN USE OF WIRELESS RESOURCE AND DEVICE THEREFOR

(71) Applicant: LG ELECTRONICS INC., Seoul (KR)

(72) Inventors: Seungmin Lee, Seoul (KR); Suckchel Yang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 15/113,008

(22) PCT Filed: Feb. 9, 2015

(86) PCT No.: PCT/KR2015/001274
§ 371 (c)(1),
(2) Date: Jul. 20, 2016

(87) PCT Pub. No.: WO2015/119465
PCT Pub. Date: Aug. 13, 2015

(65) Prior Publication Data
US 2016/0344516 A1    Nov. 24, 2016

Related U.S. Application Data

(60) Provisional application No. 61/937,521, filed on Feb. 8, 2014, provisional application No. 61/977,658, filed on Apr. 10, 2014.

(51) Int. Cl.
*H04L 1/18* (2006.01)
*H04W 72/04* (2009.01)
(Continued)

(52) U.S. Cl.
CPC .............. *H04L 1/1812* (2013.01); *H04L 1/18* (2013.01); *H04L 5/00* (2013.01); *H04L 5/0048* (2013.01);
(Continued)

(58) Field of Classification Search
CPC ....... H04L 1/1812; H04L 5/0048; H04L 5/14; H04W 72/0446
See application file for complete search history.

(56) References Cited

U.S. PATENT DOCUMENTS

2013/0315115 A1* 11/2013 Kim ................... H04J 11/0056
370/280
2013/0336300 A1* 12/2013 Choi ................... H04L 1/1861
370/336
(Continued)

FOREIGN PATENT DOCUMENTS

JP          2015139108 A  *  7/2015    ........ H04W 72/1289
KR     10-2013-0032798         4/2013
(Continued)

OTHER PUBLICATIONS

PCT International Application No. PCT/KR2015/001274, Written Opinion of the International Searching Authority dated May 18, 2015, 28 pages.
(Continued)

*Primary Examiner* — Scott M Sciacca
(74) *Attorney, Agent, or Firm* — Lee Hong Degerman Kang & Waimey

(57) ABSTRACT

The present invention relates to a method and a device for transmitting, by a terminal, an uplink signal in a wireless communication system that supports a dynamic change of a wireless resource use. Particularly, the method comprises the step of determining the transmission of an uplink signal in a specific subframe on a first uplink-downlink setting in
(Continued)

accordance with a fallback mode, wherein the fallback mode is applied if the reception of a change in use message transmitted so as to reset to a wireless resource use in accordance with a second uplink-downlink setting is not successful.

6 Claims, 10 Drawing Sheets

(51) Int. Cl.
H04L 5/00 (2006.01)
H04L 12/24 (2006.01)

(52) U.S. Cl.
CPC ........ H04L 5/0055 (2013.01); H04L 41/0654 (2013.01); H04L 41/0816 (2013.01)

(56) References Cited

U.S. PATENT DOCUMENTS

| | | | | |
|---|---|---|---|---|
| 2014/0071868 | A1* | 3/2014 | Bergquist | H04L 1/1864 370/311 |
| 2016/0192354 | A1* | 6/2016 | Wei | H04L 1/1812 370/329 |
| 2017/0012727 | A1* | 1/2017 | Yasukawa | H04W 72/1289 |

FOREIGN PATENT DOCUMENTS

| | | | |
|---|---|---|---|
| KR | 10-2013-0106352 | 9/2013 | |
| WO | 2013112372 | 8/2013 | |
| WO | 2013125930 | 8/2013 | |
| WO | 2013176466 | 11/2013 | |
| WO | WO 2015024215 A1 * | 2/2015 | ........... H04L 1/1812 |

OTHER PUBLICATIONS

European Patent Office Application Serial No. 15745945.4, Search Report dated Aug. 10, 2017, 8 pages.
Sharp, "Fallback operation and reliability improvement of explicit L1 signalling for DL-UL reconfiguration", 3GPP TSG RAN WG1 Meeting #74, R1-133228, Aug. 2013, 6 pages.
Samsung, "Remaining issues on HARQ timing for eIMTA", 3GPP TSG RAN WG1 Meeting #76, R1-140350, Feb. 2014, 3 pages.
LG Electronics, "Remaining Details of signalling for TDD eIMTA", 3GPP TSG RAN WG1 Meeting #75, R1-135454, Nov. 2013, 5 pages.
LG Electronics, "Remaining Details of Power Control enhancements for TDD eIMTA", 3GPP TSG RAN WG1 Meeting #76, R1-140296, Feb. 2014, 6 pages.
LG Electronics, "Remaining Details of Uudl Reconfiguration Signaling in TDD eIMTA", 3GPP TSG RAN WG1 Meeting #76, R1-140298, Feb. 2014, 4 pages.
Samsung, "Remaining issues on HARQ timing for eIMTA", 3GPP TSG RAN WG1 Meeting #75, R1-135190, Nov. 2013, 3 pages.
Intel, "HARQ aspect for TDD eIMTA", 3GPP TSG RAN WG1 Meeting #74, R1-132927, Aug. 2013, 4 pages.

* cited by examiner

FIG. 2
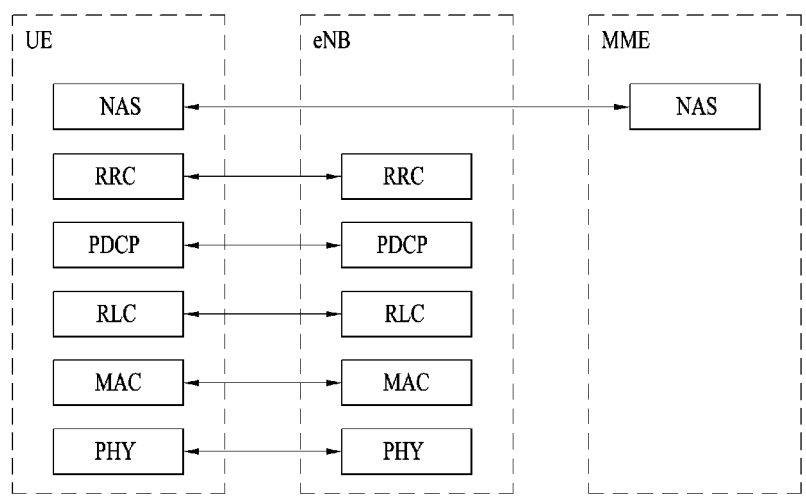
(a) Control-plane protocol stack
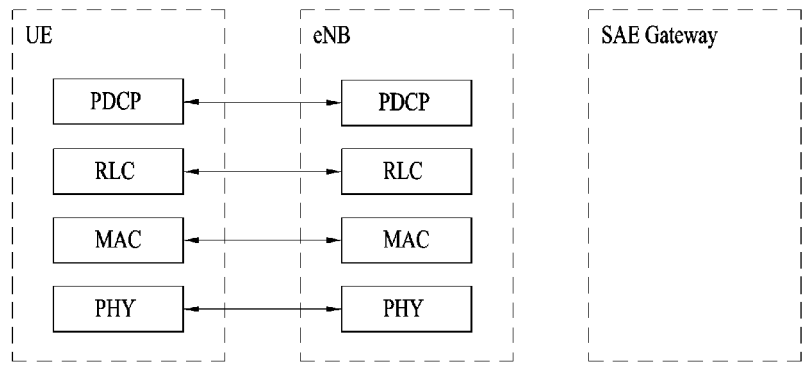
(b) User-plane protocol stack FIG. 6
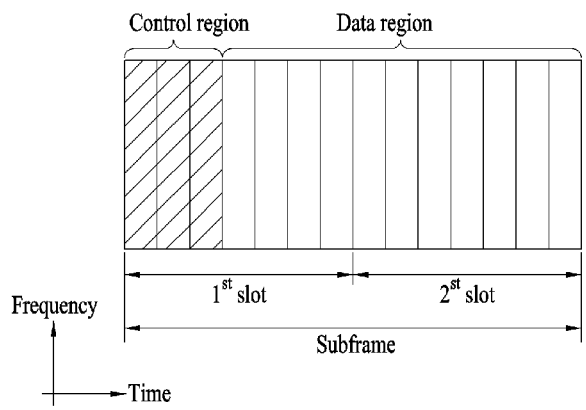
FIG. 7
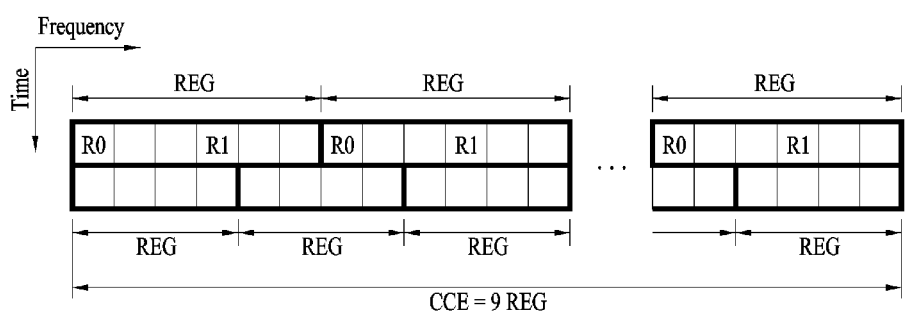
(a) 1 TX or 2 TX
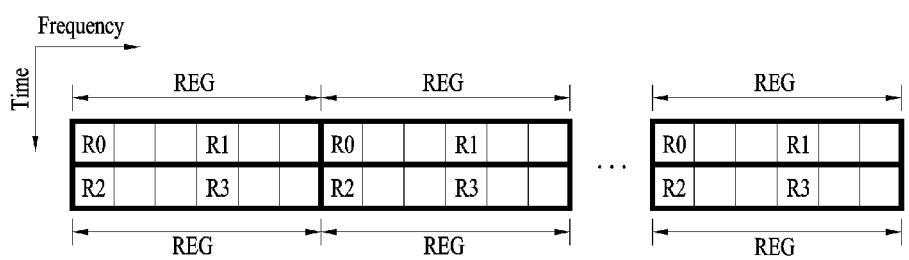
(b) 4TX

METHOD FOR TRANSMITTING UPLINK SIGNAL OF FALLBACK MODE IN WIRELESS COMMUNICATION SYSTEM THAT SUPPORTS CHANGE IN USE OF WIRELESS RESOURCE AND DEVICE THEREFOR

CROSS-REFERENCE TO RELATED APPLICATIONS

This application is the National Stage filing under 35 U.S.C. 371 of International Application No. PCT/KR2015/001274, filed on Feb. 9, 2015, which claims the benefit of U.S. Provisional Application No. 61/937,521, filed on Feb. 8, 2014 and 61/977,658, filed on Apr. 10, 2014, the contents of which are all hereby incorporated by reference herein in their entirety.

TECHNICAL FIELD

The present invention relates to a wireless communication system, and more particularly, to a method of transmitting an uplink signal in fallback mode in a wireless communication system supportive of reconfiguration of a radio resource and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

DISCLOSURE OF THE INVENTION

Technical Task

Based on the above discussion, the technical task of the present invention is to provide a method of transmitting an uplink signal in fallback mode in a wireless communication system supportive of a usage change of a radio resource and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

To achieve these objects and other advantages and in accordance with the purpose of the invention, as embodied and broadly described herein, a method of transmitting an uplink signal in a user equipment of a wireless communication system supportive of a dynamic change of radio resource usage may include the step of determining uplink signal transmission in a specific subframe on a first uplink-downlink configuration according to a fallback mode. And, the fallback mode may be applied if a reception of a reconfiguration message sent for reconfiguration for the radio resource usage according to a second uplink-downlink configuration fails to succeed.

The specific subframe may be designated as at least one of uplink subframes according to SIB1 (system information blocktype1) based uplink-downlink configuration except an uplink subframe according to downlink HARQ reference configuration. The uplink signal may be a sounding reference signal (SRS). And, the sounding reference signal may be configured to be dropped if PUSCH transmission is not scheduled in the specific subframe.

The specific subframe may be an uplink subframe according to downlink HARQ reference configuration and the uplink signal may be a sounding reference signal (SRS).

The specific subframe may be designated as at least one of uplink subframes according to SIB1 (system information blocktype1) based uplink-downlink configuration except an uplink subframe according to downlink HARQ reference configuration. The uplink signal may be configured for PUSCH retransmission. And, if PHICH (physical hybrid-arq indicator channel) indicating the PUSCH retransmission is received in the specific subframe, the uplink signal may be configured not to be transmitted. Furthermore, the PHICH information may be configured to skip decoding if indicating the PUSCH retransmission in the specific subframe. And, the method may further include the step of signaling ACK (acknowledge) to an upper layer.

The specific subframe may be designated as at least one of uplink subframes according to SIB1 (system information blocktype1) based uplink-downlink configuration except an uplink subframe according to downlink HARQ reference configuration and the uplink signal may be retransmitted in the specific subframe by UL grant based adaptive PUSCH retransmission. Furthermore, the specific subframe may be configured to drop PHICH based non-adaptive PUSCH retransmission.

In another aspect of the present invention, as embodied and broadly described herein, a user equipment in transmitting an uplink signal in a wireless communication system supportive of a dynamic change of radio resource usage may include a radio frequency unit and a processor configured to determine uplink signal transmission in a specific subframe on a first uplink-downlink configuration according to a fallback mode, wherein the fallback mode is applied if a reception of a reconfiguration message sent for reconfiguration for the radio resource usage according to a second uplink-downlink configuration fails to succeed.

Advantageous Effects

According to the present invention, uplink signal transmission in fallback mode can be efficiently supported in a wireless communication system supportive of usage change of a radio resource.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram of structures of control and user planes of a radio interface protocol between a user equipment and E-UTRAN based on 3GPP radio access network specification.

FIG. 6 is a diagram for one example of a structure of a downlink subframe.

FIG. 7 shows a resource unit used in configuring a downlink control channel in LTE system.

BEST MODE FOR INVENTION

Figure 1:
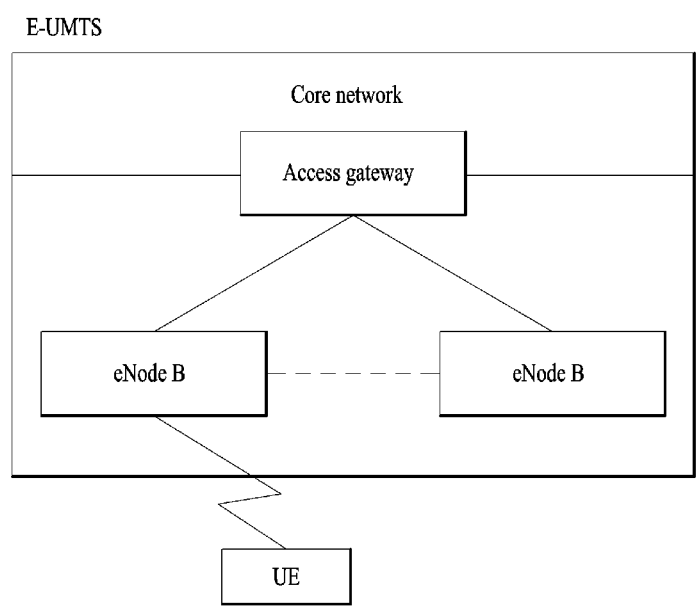
FIG. 1 shows a structure of E-UMTS network as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
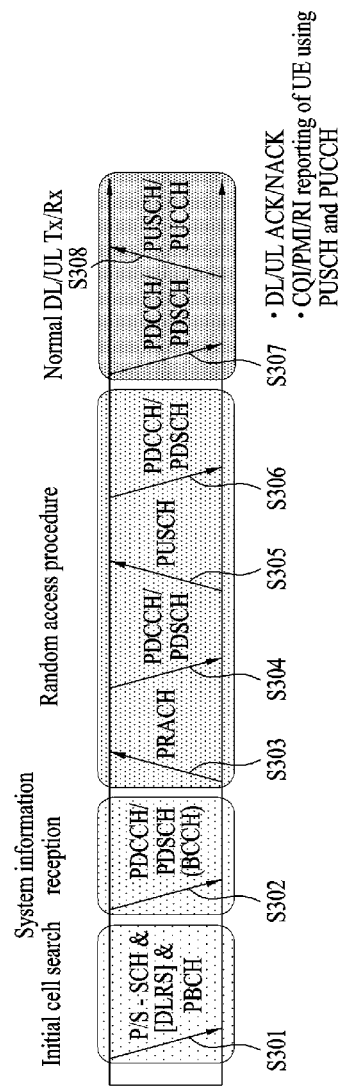
FIG. 3 is a diagram for physical channels used for 3GPP system and a general method of transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
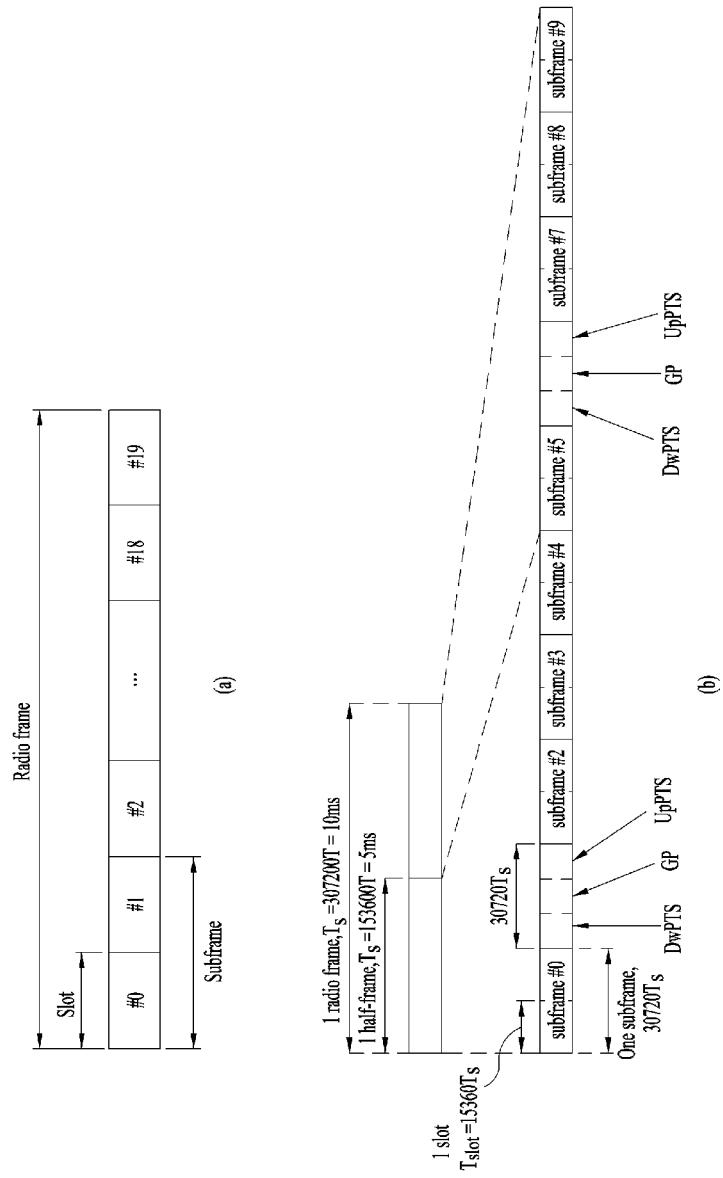
FIG. 4 is a diagram for a structure of a radio subframe used by LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(*a*) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
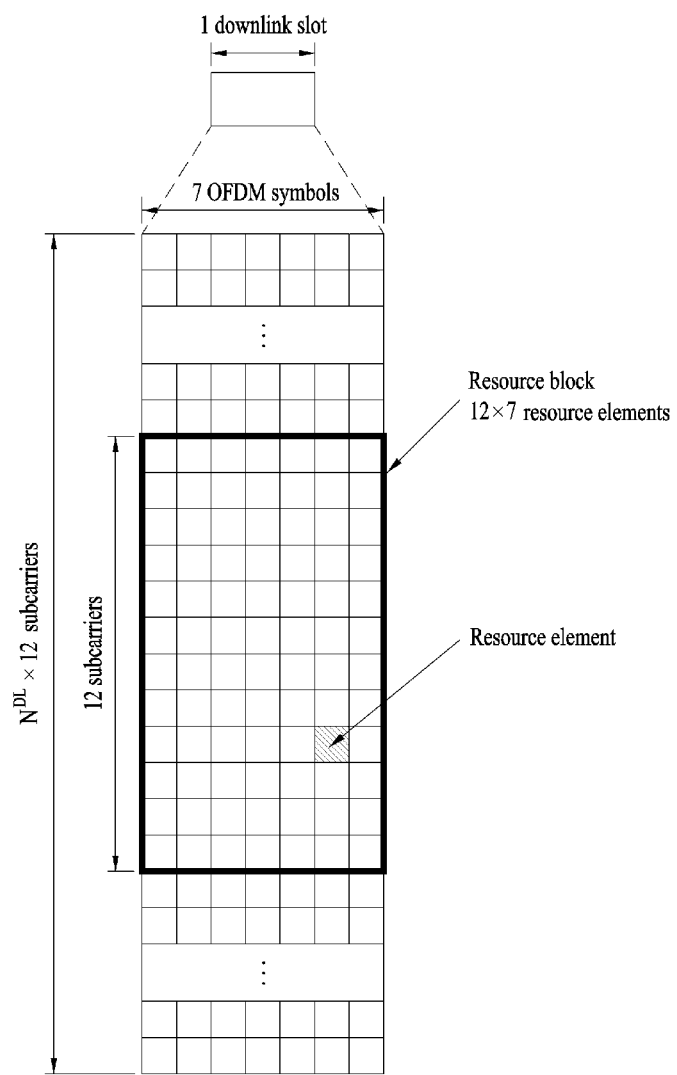
FIG. 5 is a diagram of a resource grid for a downlink slot.

FIG. 5 is a diagram of a resource grid for a downlink slot.

Referring to FIG. 5, a DL slot includes $N_{symb}^{DL}$ OFDM symbols in time domain and $N_{RB}^{DL}$ resource blocks. Since each of the resource blocks includes $N_{sc}^{RB}$ subcarriers, the DL slot includes $N_{RB}^{DL} \times N_{sc}^{RB}$ subcarriers in frequency domain. FIG. 5 shows one example that the DL slot includes 7 OFDM symbols and that the resource block includes 12 subcarriers, by which the present invention is non-limited. For instance, the number of OFDM symbols included in the DL slot can be modified according to a length of a cyclic prefix (CP).

Each element on a resource grid is called Resource Element (RE) and 1 single resource element is indicated by a single OFDM symbol index and a single subcarrier index. A single RB is configured with $N_{symb}^{DL} \times N_{sc}^{RB}$ resource elements. The number $N_{RB}^{DL}$ of resource blocks included in the DL slot is dependent on a DL transmission bandwidth configured in a cell.

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

FIG. 6 is a diagram for one example of a structure of a downlink subframe.

Referring to FIG. 6, maximum 3 (or 4) OFDM symbols situated at a head part of a 1$^{st}$ slot of a subframe correspond to a control region to which a control channel is assigned. And, the rest of OFDM symbols correspond to a data region to which PDSCH (physical downlink shared channel) is assigned. For example, DL control channels used by 3GPP LTE may include PCFICH (Physical Control Format Indicator Channel), PDCCH (Physical Downlink Control Channel), PHICH (Physical hybrid ARQ indicator Channel) and the like. The PCFICH is transmitted on a 1$^{st}$ OFDM symbol of a subframe and carries information on the number of OFDM symbols used for a control channel transmission in the subframe. The PHICH carries HARQ ACK/NACK (acknowledgment/negative-acknowledgment) signal in response to a UL transmission.

Control information transmitted on PDCCH is called DCI (downlink control information). The DCI includes resource allocation information and other control informations for a user equipment or a user equipment group. For instance, the DCI may include UL/DL scheduling information, UL transmission (Tx) power control command and the like.

PDCCH carries transmission format and resource allocation information of DL-SCH (downlink shared channel), transmission format and resource allocation information of UL-SCH (uplink shared channel), paging information on PCH (paging channel), system information on DL-SCH, resource allocation information of an upper-layer control message such as a random access response transmitted on PDSCH, Tx power control command set for individual user equipments within a user equipment group, Tx power control command, activation indication information of VoIP (voice over IP) and the like. A plurality of PDCCHs may be transmitted in a control region. A user equipment can monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. For instance, if PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH is provided for system information (particularly, SIC (system information block)), CRC may be masked with SI-RNTI (system information-RNTI). And, if PDCCH is provided for a random access response, CRC may be masked with RA-RNTI (random access-RNTI).

FIG. 7 is a diagram of a resource unit used in configuring a control channel in LTE system. In particular, FIG. 7 (a) shows a case that the number of transmitting antenna(s) of a base station is 1 or 2. And, FIG. 7 (b) shows a case that the number of transmitting antennas of a base station is 4. The cases only differ from each other in RS (reference signal) pattern but have the same method of configuring a resource unit related to a control channel.

Referring to FIG. 7, a basic resource unit of a control channel is REG. The REG includes 4 neighboring resource elements (REs) except RS. The REG is indicated by a bold line in the drawing. PCFICH and PHICH include 4 REGs and 3 REGs, respectively. PDCCH is configured by CCE (control channel elements) unit and one CCE includes 9 REGs.

A user equipment is set to check $M^{(L)}$ ($\geq L$) CCEs, which are contiguous to each other or arranged by specific rules, in order to check whether PDCCH configured with L CCEs is transmitted to the corresponding user equipment. The L value, which should be considered by the user equipment for PDCCH reception, may become a plural number. CCE sets, which should be checked by the user equipment for the PDCCH reception, are called a search space. For instance, LTE system defines a search space as Table 3.

TABLE 3

| Search space $S_k^{(L)}$ | | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 3, CCE aggregation level L indicates the number of CCEs configuring PDCCH, $S_k^{(L)}$ indicates a search space of the CCE aggregation level L, and $M^{(L)}$ indicates the number of PDCCH candidates supposed to be monitored in the search space of the aggregation level L.

The search space may be categorized into a UE-specific search space accessible by a specific user equipment only and a common search space accessible by all user equipments in a cell. A user equipment monitors a common search space having a CCE aggregation level set to 4 or 8 and a UE-specific search space having a CCE aggregation level set to 1, 2, 4 or 8. And, the common search space and the UE-specific search space may overlap each other.

A position of a 1$^{st}$ CCE (i.e., CCE having a smallest index) in PDCCH search space given to a random user equipment for each CCE aggregation level value may vary in each subframe according to a user equipment. This may be called a PDCCH search space hashing.

The CCE may be distributed on system band. Particularly, a plurality of logically contiguous CCEs may be inputted to an interleaver. And, the interleaver performs a function of mixing a plurality of the inputted CCEs by REG unit. Hence, frequency/time resource forming one CCE is distributed in a manner of being physically scattered in whole frequency/time region within a control region of a subframe. Eventually, although a control channel is configured by CCE unit, as interleaving is performed by REG unit, it is able to maximize frequency diversity and interference randomization gain.

Figure 8:
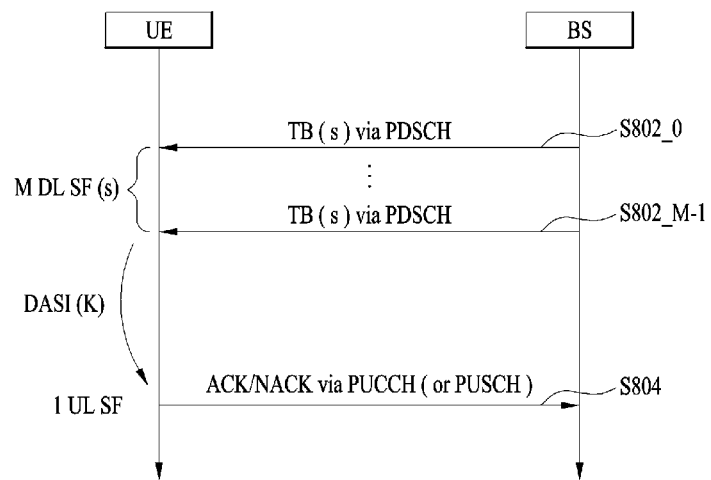
FIG. 8 shows TDD UL ACK/NACK transmitting process in single cell situation.

FIG. 8 shows TDD UL ACK/NACK transmitting process in single cell situation.

Referring to FIG. 8, UE can receive at least one DL transmission (e.g., PSCH signal) in M DL subframes (SF) [S802_0~S802_M-1]. Each PDSCH signal is used to transmit one or more (e.g., 2) transport blocks (TB) (or, codeword (CW)) according to transmission mode. Moreover, in the steps S802_0~S802_M-1, PDCCH signal requiring ACK/NACK response, e.g., PDCCH signal (simply SPS release PDCCH signal) indicating SPS release can be received. If PDSCH signal and/or SPS release PDCCH signal exists in M DL subframes, the UE transmits ACK/NACK in one UL subframe corresponding to the M DL subframes through a process for transmitting ACK/NACK (e.g., ACK/NACK (payload) creation, ACK/NACK resource allocation, etc.)

[S804]. The ACK/NACK includes reception response information on the PDSCH signal and/or SPS release PDCCH signal in the steps S802_0~S802_M−1. Although ACK/NACK is basically transmitted on PUSCCH, if there is PUSCH transmission at the timing of ACK/NACK transmission, ACK/NACK can be transmitted on PUSCH. Various PUCCH formats are available for ACK/NACK transmission. Moreover, in order to reduce the number of the transmitted ACK/NACK bits, various methods such as ACK/NACK bundling, ACK/NACK channel selection and the like can be used.

As mentioned in the foregoing description, in TDD, ACK/NACK for data received in M DL subframes is transmitted in one UL subframe (i.e., M DL SF(s): 1 UL SF), and the relation between them is given by DASI (downlink association set index).

Table 4 shows DASI(K:{$k_0, k_1, \ldots k_{M-1}$}) defined in LTE(-A). Table 4 shows interval from DL subframe associated with UL subframe for transmitting ACK/NACK. Particularly, if there is PDSCH transmission and/or SPS release PDCCH in subframe n−k (k∈K), UE transmits ACK/NACK corresponding to subframe n.

Table 5 shows one example of channel selection mapping table defined in LTE system.

TABLE 5

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |

TABLE 4

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

If operating by TDD scheme, UE should transmit ACK/NACK signal for at least one DL transmission (e.g., PDSCH), which is received in M DL SF, in one UL SF. ACK for a plurality of DL SF can be transmitted in one UL SF in a manner as follows.

1) ACK/NACK bundling: ACK/NACK bits for a plurality of data units (e.g., PDSCH, SPS release PDCCH, etc.) are combined by logical operation (e.g., Logic-AND Operation). For instance, if all data units are successfully decoded, a receiving end (e.g., UE) sends ACK signal. On the other hand, if any one of the data units fails in decoding (or detection), the receiving end sends NACK signal or none.

2) Channel selection: UE configured to receive a plurality of data units (e.g., PDSCH, SPS release PDCCH, etc.) occupies a plurality of PUCCH resources for ACK/NACK transmission. ACK/NACK response to a plurality of the data units is identified by the combination of a PUCCH resource actually used for ACK/NACK transmission and a transmitted ACK/NACK content (e.g., bit value, QPSK symbol value, etc.). Channel selection scheme can be called ACK/NACK selection scheme or PUSCCH selection scheme.

The channel selection scheme is described in detail. According to the channel selection scheme, if receiving a plurality of DL data, UE occupies a plurality of UL physical resources (e.g., PUCCH resources) in order to transmit multiplexed ACK/NACK signal. For instance, if receiving a plurality of PDSCH, UE can occupy the same number of PUCCH resources using specific CCE of PDCCH indicating each PDSCH. In this case, it is able to transmit the multiplexed ACK/NACK signal using a combination of selection of a specific one of a plurality of the occupied PUCCH resources and a demodulated/coded content applied to the selected PUCCH resource.

TABLE 5-continued

| HARQ-ACK(0), HARQ-ACK(1), HARQ-ACK(2), HARQ-ACK(3) | $n_{PUCCH}^{(1)}$ | b(0), b(1) |
|---|---|---|
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | No transmission | |

In Table 5, HARQ-ACK(i) indicates HARQ ACK/NACK/DTX response of $i^{th}$ data unit (0≤I≤3). HARQ ACK/NACK/DTX response includes ACK, NACK, DTX and NACK/DTX. NACK/DTX indicates NACK or DTX. ACK and NACK indicate decoding success and failure of transport block (equivalent to code block) transmitted on PDSCH, respectively. DTX (Discontinuous Transmission) indicates PDCCH detection failure. In association with each data unit, maximum 4 PUCCH resources (i.e., $n_{PUCCH,0}^{(1)} \sim n_{PUCCH,3}^{(1)}$) can be occupied. Multiplexed ACK/NACK is transmitted one PUCCH resource selected from the occupied PUCCH resources. $n_{PUCCH,I}^{(1)}$ disclosed in Table 5 indicates PUCCH resource actually used in sending ACK/NACK. b(0)b(1) indicates two bits transmitted on the selected PUCCH resource and is modulated by QPSK scheme. For instance, if UE successfully decodes 4 data units, the UE transmits (1, 1) on the PUCCH resource connected to $n_{PUCCH,1}^{(1)}$ to a base station. Since the combination of PUCCH resource and QPSK symbol is not enough to represent all possible ACK/NACK assumptions, NACK and DTX are coupled except some cases [NACK/DTX, N/D].

Figure 9:
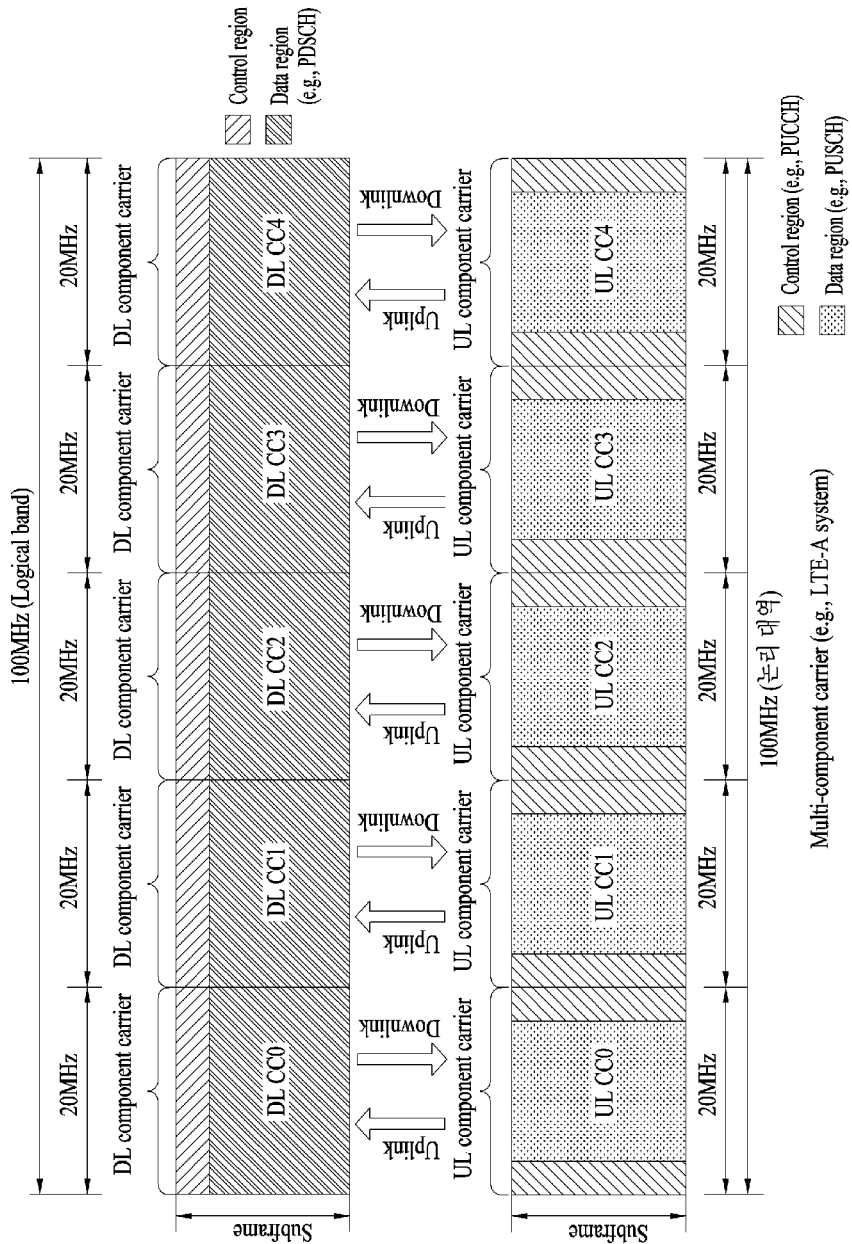
FIG. 9 is a diagram for one example of CA (carrier aggregation) communication system.

FIG. 9 shows one example of a carrier aggregation (CA) communication system.

Referring to FIG. 9, a plurality of UL/DL CCs (uplink/downlink component carriers) are aggregated so as to support a wider UL/DL bandwidth. The terminology 'component carrier (CC)' can be substituted with another equivalent terminology (e.g., carrier, cell, etc.). The respective CCs may be adjacent or non-adjacent to each other in a frequency domain. A bandwidth of each of the component carriers may be determined independently. It is possible to configure asymmetric carrier aggregation in which the number of UL CCs is different from that of DL CCs. Meanwhile, a control information may be set to be transceived through a specific CC only. Such a specific CC may be named a primary CC (or an anchor CC), while other CCs may be named secondary CCs.

In case of applying a cross-carrier scheduling (or a cross-CC scheduling), a PDCCH for a DL assignment may be transmitted on DL CC #0 and a corresponding PDSCH may be transmitted on DL CC #2. For the cross-CC scheduling, it may be able to consider an introduction of a carrier indicator field (CIF). A presence or non-presence of a CIF in PDCCH can be set by an upper layer signaling (e.g., RRC signaling) in a semi-static manner of a UE-specific (or UE group-specific) manner. A baseline of PDCCH transmission is summarized as follows.

CIF disabled: PDCCH on DL CC allocates PDSCH resource on the same DL CC or PUSCH resource on a linked UL CC.
No CIF
Same as LTE PDCCH structure (same coding, same CCE-based resource mapping) and DCI format
CIF enabled: PDCCH on DL CC can allocate PDSCH or PUSCH resource on a specific DL/UL CC among a plurality of aggregated DL/UL CCs using CIF.
Extended LTE DCI format having CIF
CIF (enabled) corresponds to a fixed x-bit field (e.g., x=3)
CIF (enabled) location is fixed irrespective of DCI format size
Reuse LTE PDCCH structure (same coding, same CC-based resource mapping)

If a CIF is present, a base station is able to assign a PDCCH monitoring DL CC set to lower BD complexity of a user equipment side. The PDCCH monitoring DL CC set includes at least one DL CC as apportion of full DL CCs and a user equipment performs detection/decoding of PDCCH on the corresponding DL CC only. In particular, in case that a base station schedules PDSCH/PUSCH for a user equipment, the PDCCH is transmitted on a PDCCH monitoring DL CC set only. The PDCCH monitoring DL CC set can be configured in a UE-specific manner, a UE-group-specific manner, or a cell-specific manner. The terminology 'PDCCH monitoring DL CC set' can be substituted with such an equivalent terminology as a monitoring carrier, a monitoring cell or the like. Moreover, a CC aggregated for a user equipment can be substituted with such an equivalent terminology as a serving CC, a serving carrier, a serving cell or the like.

Figure 10:
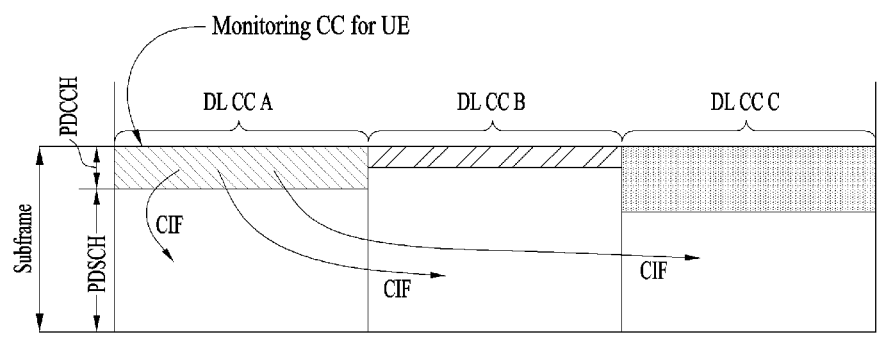
FIG. 10 is a diagram for one example of scheduling in case that a plurality of carriers are aggregated.

FIG. 10 shows one example of a scheduling in case of aggregating a plurality of carriers. Assume that 3 DL CCs are aggregated. Assume that DL CC A is configured as a PDCCH monitoring DL CC. DL CC A~C may be called a serving CC, a serving carrier, a serving cell, or the like. If a CIF is disabled, each DL CC can transmit only a PDCCH for scheduling its PDSCH without CIF in accordance with LTE PDCCH configuration. On the other hand, if a CIF is enabled by a UE-specific (or, UE-group-specific, cell-specific) upper layer signaling, DL CC A (i.e., a monitoring DL CC) can transmit not only a PDCCH for scheduling a PDSCH of DL CC A but also a PDCCH for scheduling a PDSCH of another CC using the CIF. In this case, a PDCCH is not transmitted on DL CC B/C failing to be set as a PDCCH monitoring DL CC. Hence, the DL CC A (i.e., the monitoring DL CC) should include a PDCCH search space related to the DL CC A, a PDCCH search space related to the DL CC B and a PDCCH search space related to the DL CC C all. In the present specification, assume that a PDCCH search space is defined for each carrier.

As mentioned in the foregoing description, LTE-A currently considers using a CIF within PDCCH for cross-CC scheduling. A presence or non-presence of a use of a CIF (i.e., a support of a cross-CC scheduling mode or a non-cross-CC scheduling mode) and an inter-mode switching may be configured semi-statically/UE-specifically through an RRC signaling. After a user equipment has gone through the corresponding RRC signaling, the user equipment is able to recognize whether a CIF is used within a PDCCH that will be scheduled for the corresponding user equipment.

In the following, for HARQ-ACK transmission in TDD CA, a case that channel selection scheme using PUCCH format 1b is described. Legacy LTE-A assumes a case that 2 serving cells (i.e., PCell and SCell) (or, PCC and SCC) having the same TDD UL-DL Cfg are aggregated together.

First of all, described is a channel selection scheme using PUCCH format 1b in case of 'M≤2' in UL subframe n for HARQ-ACK transmission. In this case, M corresponds to the element number (i.e., the number of DL SF corresponding to UL SF) in the set K described with reference to Table 5. In case of M≤2 in UL subframe n, UE can transmit b(0)b(1) on PUCCH resource selected from A PUCCH resources ($n^{(1)}_{PUCCH,i}$) [0≤i≤A−1 and A ⊂ {2, 3, 4}]. Particularly, UE transmits A/N signal according to Tables 6 to 8 using PUCCH format 1b in UL subframe n. In case of M=1 in UL subframe n, HARQ-ACK(j) indicates A/N response for transport block or SPS release PDCCH related to serving cell c. In this case, if M=1, transport block, HARQ-ACK(j) and A PUCCH resources can be given by Table 9. If M=2 in UL subframe n, HARQ-ACK(j) indicates A/N response for transport block or SPS release PDCCH within DL subframe(s) given by a set K in each serving cell. In this case, if M=2, subframes on each serving cell for HARQ-ACK(j) and A PUCCH resources can be given by Table 10.

Table 6 shows one example of a channel selection mapping table defined in LTE-A system in case of M=1 and A=2 when two CCs having the same UL-DL Cfg are aggregated.

TABLE 6

| HARQ-ACK(0), HARQ-ACK(1) | $n_{PUCCH}^{(1)}$ | b(0)b(1) |
|---|---|---|
| ACK, ACK | $n_{PUCCH, 1}^{(1)}$ | 1, 0 |
| ACK, NACK/DTX | $n_{PUCCH, 0}^{(1)}$ | 1, 1 |
| NACK/DTX, ACK | $n_{PUCCH, 1}^{(1)}$ | 0, 1 |
| NACK, NACK/DTX | $n_{PUCCH, 0}^{(1)}$ | 0, 0 |
| DTX, NACK/DTX | No Transmission | |

In this case, Implicit resource linked to PDCCH (i.e., PCC-PDCCH) for scheduling PCC (or PCell) may be allocated to $n^{(1)}_{PUCCH,0}$ and, implicit PUCCH resource linked to PDCCH (i.e., SCC-PDCCH) for scheduling SCC according to a presence or non-presence of cross CC scheduling or explicit PUCCH resource reserved by RRC can be allocated to $n^{(1)}_{PUCCH,1}$. For instance, in cross-CC scheduling situation, implicit PUCCH resource linked to PCC-PDCCH and implicit PUCCH resource linked to SCC-PDCCH can be allocated to $n^{(1)}_{PUCCH,0}$ and $n^{(1)}_{PUCCH,1}$, respectively.

Table 7 shows one example of a channel selection mapping table defined in LTE-A system in case of M=1 and A=3 when two CCs having the same UL-DL Cfg are aggregated.

TABLE 7

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | |

In this case, if PCC is MIMO CC and SCC is non-MIMO CC, implicit PUCCH resource linked to PCC-PDCCH can be allocated to $n^{(1)}_{PUCCH,0}$ and $n^{(1)}_{PUCCH,1}$ and implicit PUCCH resource linked to SCC-PDCCH according to a presence or non-presence of cross-CC scheduling or explicit PUCCH resource reserved by RRC can be allocated to $n^{(1)}_{PUCCH,2}$. If PCC is non-MIMO CC and SCC is MIMO CC, implicit PUCCH resource linked to PCC-PDCCH can be allocated to $n^{(1)}_{PUCCH,0}$ and implicit PUCCH resource linked to SCC-PDCCH or explicit PUCCH resource reserved by RRC can be allocated to $n^{(1)}_{PUCCH,1}$ and $n^{(1)}_{PUCCH,2}$ according to a presence or non-presence of cross-CC scheduling. N Table 8 shows one example of a channel selection mapping table defined in LTE-A system in case of M≤2 and A=4 when two CCs having the same UL-DL Cfg are aggregated.

TABLE 8

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

In this case, implicit PUCCH resource linked to PDCCH (i.e., PCC-PDCCH) for scheduling PCC (or PCell) is allocated to $n^{(1)}_{PUCCH,2}$ and/or $n^{(1)}_{PUCCH,3}$ irrespective of a presence or non-presence of cross-CC scheduling and implicit PUCCH resource linked to PDCCH (i.e., SCC-PDCCH) for scheduling SCC according to a presence or non-presence of cross-CC scheduling or explicit PUCCH resource reserved by RRC can be allocated to $n^{(1)}_{PUCCH,2}$ and/or $n^{(1)}_{PUCCH,3}$, respectively. For instance, if M=2 in cross-CC scheduling situation, implicit PUCCH resources linked to PCC-PDCCH of 1$^{st}$ DL SF and 2$^{nd}$ DL SF can be allocated to $n^{(1)}_{PUCCH,0}$ and $n^{(1)}_{PUCCH,1}$, respectively and implicit PUCCH resources linked to SCC-PDCCH of 1$^{st}$ DL SF and 2$^{nd}$ DL SF can be allocated to $n^{(1)}_{PUCCH,2}$ and $n^{(1)}_{PUCCH,3}$, respectively.

Table 9 shows one example of transport block, HARQ-ACK(j) and PUCCH resource if M=1.

TABLE 9

| | | HARQ-ACK(j) | | | |
|---|---|---|---|---|---|
| A | | HARQ-ACK(0) | HARQ-ACK(1) | HARQ-ACK(2) | HARQ-ACK(3) |
| 2 | TB1 | TB1 | NA | NA | |
| | Primary cell | Secondary cell | | | |
| 3 | TB1 | TB2 | TB1 | NA | |
| | Serving cell1 | Serving cell1 | Serving cell2 | | |
| 4 | TB1 | TB2 | TB1 | TB2 | |
| | Primary cell | Primary cell | Secondary cell | Secondary cell | |

* TB: (transport block),

NA: not available

Table 10 shows one example of transport block, HARQ-ACK(j) and PUCCH resource if M=2.

TABLE 10

| | | HARQ-ACK(j) | | | |
|---|---|---|---|---|---|
| A | | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell | |

In the following, if M>2 in UL subframe n for HARQ-ACK transmission, channel selection scheme using PUCCH format 1b is described. Basic items are equal or similar to the case of M≤2. Particularly, UE transmits A/N signal according to Table 12 and Table 13 using PUCCH format 1b in UL subframe n. If M>2 in UL subframe n, $n^{(1)}_{PUCCH,0}$ and $n^{(1)}_{PUCCH,1}$ are associated with DL transmission(s) (e.g., PDSCH transmission(s)) on PCell and $n^{(1)}_{PUCCH,2}$ and $n^{(1)}_{PUCCH,3}$ are associated with DL transmission(s) (e.g., PDSCH transmission(s)) on SCell.

Moreover, HARQ-ACK(i) for random cell means A/N response to PDCCH (PDSCH corresponding to PDCCH) of which DAI-c for scheduling the corresponding cell is i+1. Meanwhile, if PDSCH w/o PDCCH exists, HARQ-ACK(0) may mean A/N response to the corresponding PDSCH w/o PDCCH and HARQ-ACK(i) may mean A/N response to PDCCH (PDSCH corresponding to PDCCH) of which DAI-c is i.

Table 11 shows one example of a channel selection mapping table defined in LTE-A system in case of M=3 when two CCs having the same UL-DL Cfg are aggregated.

TABLE 11

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

In this case, implicit PUCCH resource linked to PDCCH (i.e., PCC-PDCCH) for scheduling PCC (or PCell) irrespective of a presence or non-presence of cross-CC scheduling can be allocated to $n^{(1)}_{PUCCH,0}$ and/or $n^{(1)}_{PUCCH}$ and implicit PUCCH resource linked to PDCCH (i.e., SCC-PDCCH) for scheduling SCC according to a presence or non-presence of cross-CC scheduling or explicit PUCCH resource reserved by RRC can be allocated to $n^{(1)}_{PUCCH,2}$ and/or $n^{(1)}_{PUCCH,3}$. For instance, in TDD situation, implicit PUCCH resources linked to PCC-PDCCH having DAI-c set to 1 and 2 can be allocated to $n^{(1)}_{PUCCH,0}$ and $n^{(1)}_{PUCCH,1}$, respectively. And, implicit PUCCH resources linked to SCC-PDCCH having DAI-c set to 1 and 2 can be allocated to n(1)PUCCH,2 and n(1)PUCCH,3, respectively.

Table 13 shows one example of a channel selection mapping table defined in LTE-A system in case of M=4 when two CCs having the same UL-DL Cfg are aggregated.

TABLE 13

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |

TABLE 13-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation $b(0), b(1)$ | RM Code Input Bits $o(0), o(1), o(2), o(3)$ |
|---|---|---|---|---|
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

In this case, $n^{(1)}_{PUCCH,0}$, $n^{(1)}_{PUCCH,1}$, $n^{(1)}_{PUCCH,2}$ and $n^{(1)}_{PUCCH,3}$ can be allocated as shown in Table 11 exemplarily.

Figure 11:
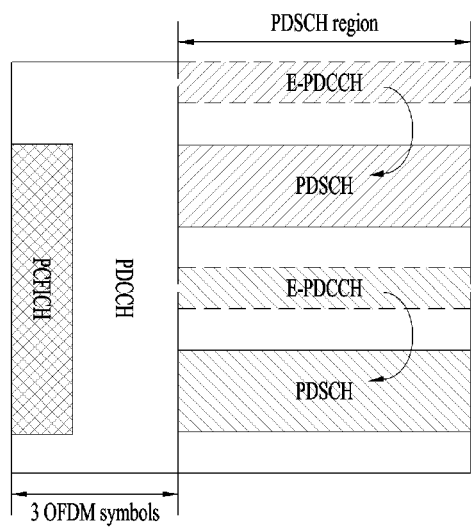
FIG. 11 is a diagram for one example of PDSCH scheduled by EPDCCH and EPDCCH.

FIG. 11 shows one example of EPDCCH and PDSCH scheduled by EPDCCH.

Referring to FIG. 11, EPDCCH can be used by defining a portion of PDSCH region for transmitting data in general. And, user equipment should perform a blind decoding process for detecting a presence or non-presence of its EPDCCH. Although EPDCCH performs the same scheduling operation (i.e., PDSCH/PUSCH control) of an existing legacy PDCCH, if the number of user equipments currently accessing such a node as RRH increases, a great number of EPDCCHs are assigned within a PRSCH region to increase a count of the blind decoding the user equipment should perform. Hence, it is disadvantageous in that complexity may increase possibly.

Figure 12:
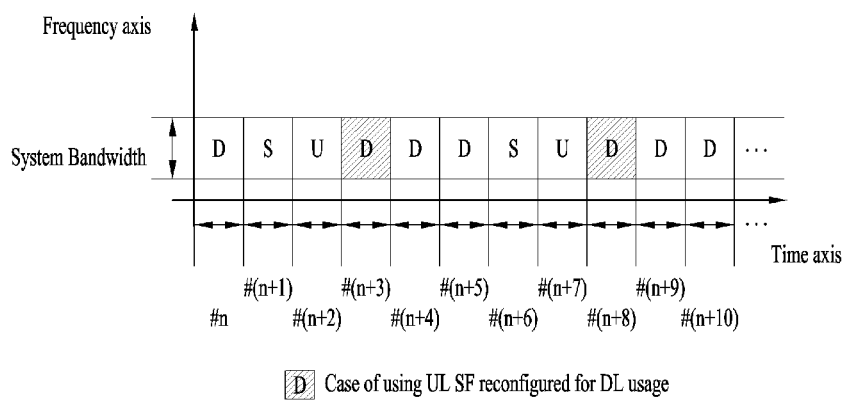
FIG. 12 shows a case that legacy subframes are reconfigured with static subframe set and dynamic subframe set in TDD system environment.

FIG. 12 shows a case that a specific cell uses a portion of legacy UL resource (i.e., UL SF) in a manner of changing it for the purpose of DL communication as DL load amount of a system increases in TDD system environment.

In FIG. 12, UL-DL configuration configured through SIB is assumed as UL-DL #1 (i.e., DSUUDDSUUD). And, FIG. 12 shows a case that legacy UL SF #(n+3) and legacy UL SF #(n+8) are used in a manner of being changed for the usage of DL communication through predefined signal (e.g., physical/higher layer signal or system information signal).

Based on the aforementioned description, in case that the usage of radio resource proposed by the present invention is dynamically changed according to a load state of system, a method for UE to efficiently transmit UL signal is described as follows. According to the present invention, UL signal may mean at least one of UL data channel (PUSCH), sounding reference signal (SRS), UL control channel (PUCCH) and scheduling request (SR).

For clarity of the description, the present invention is described on the basis of 3GPP LTE system. Yet, the scope of the system to which the present invention is applied is extensible to other systems as well as to 3GPP LTE system. And, embodiments of the present invention can be extended and applied to a case that resource on specific cell (or component carrier (CC)) is dynamically changed according to a load state of system in CA (carrier aggregation) applied environment. Moreover, embodiments of the present invention can be extended applied to a case that the usage of radio resource is dynamically changed in TDD or FDD system.

If failing to successfully receive a reconfiguration message sent by a base station, UE can perform at least one of i) channel (CSI) measurement operation, ii) DL control channel (PDCCH) monitoring operation, and iii) DL data channel (PDSCH) receiving operation, based on UL-DL configuration on SIB 1. In this case, regarding the channel measurement operation, UE decodes explicit L1 signaling for reconfiguration. If valid UL-DL configuration is detected, the UE measures CSI within subframes indicated as DL subframes or special subframes only through explicit L1 signaling for reconfiguration. If the UE fails to detect L1 signaling for carrying valid UL-DL configuration for radio frame, the UE can measure CSI within subframes indicated as DL subframes or special frames only. Moreover, PDCCH or PDSCH receiving operation is described as follows. If UE detects L1 signaling for carrying valid UL-DL configuration for radio frame, the UE monitors non-DRX DL subframe or special subframe indicated by explicit L1 signaling. If UE fails to detect L1 signaling for carrying valid UL-DL configuration for radio frame, the UE monitors non-DRX DL subframe or special subframe for PDCCH or EPDCCH indicated by SIB-1 configuration.

The valid UL-DL configuration is described as follows. DL HARQ reference configuration can be selected from Rel-8 TDD UL-DL configuration {2, 4, 5}. For UE for which TDD eIMTA (Further Enhancements to LTE Time Division Duplex (TDD) for Downlink-Uplink Interference Management and Traffic Adaptation) is configured, UL scheduling timing and HARQ timing follow UL-DL configuration signaled through SIB1. Under the valid UL HARQ reference configuration or DL HARQ reference configuration, UL or special subframe on DL HARQ reference configuration can be regarded as not used as DL subframe dynamically.

In particular, the aforementioned operations i) to iii) are named 'fallback operation (or fallback mode)'. Through this, a base station can: i) minimize damage caused by interference generated from UE failing to receive a reconfiguration message successfully to communication between another UE and a base station (or, communication between legacy UE and base station); or ii) minimize malfunction of UE failing to receive a reconfiguration message successfully.

Moreover, according to the present invention, if UE performs such a fallback operation, a method of efficiently transmitting UL signal (e.g., PUSCH, PUCCH, SRS, and SR) is described in detail. Through the application of the present invention, it is able to guarantee UL signal transmission and reception of high reliability for UE performing the fallback operation. And, it is also able to stably protect communication between another UE and a base station (or, communication between legacy UE and base station).

For clarity of the description of the present invention, a subframe on which reconfiguration is performed shall be named 'flexible subframe', while a subframe on which reconfiguration is not performed or a subframe used for a fixed usage (relatively) shall be named 'static subframe'. For instance, flexible subframe can be designated as the rest of UL subframes except UL subframes on DL HARQ reference configuration among UL subframes on SIB 1 based UL-DL configuration. And, static subframe can be designated as UL subframes on DL HARQ reference configuration and DL subframes on UL HARQ reference configuration (or, SIB 1 based UL-DL configuration).

1. SRS Transmission According to Present Invention

According to the present invention, in case that UE set for SRD transmission on specific flexible subframe (i.e., Flexible Subframe #N) before performing fallback operation performs fallback operation, the SRS transmission can be performed based on at least one of Scheme 1-A and Scheme 1-B.

1.1. Scheme 1-A

Only if UL data channel (PUSCH) transmission is scheduled in specific flexible subframe (i.e., Flexible Subframe #N) in fallback mode, a corresponding SRS and SRS transmission related resource region can be set to be transmitted together with UL data channel (PUSCH) by being rate-matched. So to speak, if UL data channel (PUSCH) transmission is not scheduled in specific flexible subframe (i.e., Flexible Subframe #N), the corresponding SRS transmission can be omitted or dropped.

1.2. Scheme 1-B

In fallback mode, SRS transmission in specific flexible subframe (i.e., Flexible Subframe #N) can be set to be omitted or SRS transmission in all flexible subframes may be set to be omitted. So to speak, SRS transmission can be (identically) performed in static UL subframes (e.g., UL subframes on DL HARQ reference configuration) only.

In particular, when Scheme 1-B is applied, if UL data channel (PUSCH) transmission is scheduled in specific flexible subframe (i.e., Flexible Subframe #N), UE can set a cell-specific resource region related to SRS transmission to always transmit UL data channel (PUSCH) by being rate-matched no matter whether a resource region (i.e., location of PUSCH (frequency) resource assignment) scheduled in association with the corresponding UL data channel (PUSCH) transmission overlaps SRS transmission related cell-specific resource region (i.e., location of cell-specific SRS (frequency) resource assignment. Alternatively, no matter whether the corresponding UL data channel (PUSCH) transmission related (scheduled) resource region is included in the SRS transmission related cell-specific resource region, the UE can set the SRS transmission related cell-specific resource region to always transmit UL data channel (PUSCH) by being rate-matched. Moreover, the present scheme may be configured to be always applied in flexible subframe no matter whether UE's fallback operation is performed.

2. UL Data Channel Retransmission According to Present Invention

UE performing fallback operation or UE in fallback mode can be set to perform UL data channel (PUSCH) retransmission based on at least one (i.e., some or all) of Schemes 2-A to 2-C.

2.1. Scheme 2-A

In fallback mode, if UL scheduling information (UL grant) is received in specific static DL subframe (i.e., Static DL Subframe #M) according to UL HARQ reference configuration, UL data channel (PUSCH) initial transmission for the reception is assumed as performed in static UL subframe (i.e., Static UL Subframe #(M+K1) and NACK (PHICH) information on the corresponding initial transmission is assumed as received in another static DL subframe (i.e., Static DL Subframe #(M+K2). On such assumption, if UL data channel (PUSCH) retransmission based on the corresponding PHICH (i.e., NACK) information should be performed in specific flexible subframe (i.e., Flexible Subframe #(M+K3), the UE can be set to omit or drop the UL data channel (PUSCH) retransmission in the corresponding specific flexible subframe (i.e., Flexible Subframe #(M+K3).

In other words, the UL data channel (PUSCH) retransmission or UL data channel (PUSCH) initial transmission can be performed in static UL subframes (e.g., UL subframes on DL HARQ Reference Configuration) only.

2.1. Scheme 2-A

In fallback mode, if UL scheduling information (UL grant) is received in specific static DL subframe (i.e., Static DL Subframe #M) according to UL HARQ reference configuration, UL data channel (PUSCH) initial transmission for the reception is assumed as performed in static UL subframe (i.e., Static UL Subframe #(M+K1) and NACK (PHICH) information on the corresponding initial transmission is assumed as received in another static DL subframe (i.e., Static DL Subframe #(M+K2).

On such assumption, if UL data channel (PUSCH) retransmission based on the corresponding PHICH (i.e., NACK) information should be performed in specific flexible subframe (i.e., Flexible Subframe #(M+K3), the UE can be set to transmit ACK information to an upper layer of the UE by skipping decoding of PHICH information indicating the UL data channel (PUSCH) retransmission in the corresponding specific flexible subframe (i.e., Flexible Subframe #(M+K3) [received in previous static DL subframe (i.e., Static DL Subframe #(M+K2))]. The reason for this is to prevent a delay due to PUSCH retransmission in specific flexible subframe in a manner of enabling the UE to determine that the initial transmission (i.e., Static UL Subframe #(M+K1) has been successfully performed for the upper layer of the UE.

In this case, the present scheme can be extended and applied to a case that UL data channel (PUSCH) initial transmission is exceptionally performed irrespective of subframe type (e.g., static subframe, flexible subframe).

2.3. Scheme 2-C

UE performing fallback operation can be set to perform UL data channel (PUSCH) (re)transmission (e.g., adaptive PUSCH retransmission) based on UL control information (UL grant) in flexible subframe only and omit or drop PHICH based UL data channel (PUSCH) retransmission (e.g., non-adaptive PUSCH retransmission).

Furthermore, the present Scheme 2-C can be implemented in a manner of being combined with at least one of Scheme 2-A and Scheme 2-B in the foregoing description.

3. PUSCH Retransmission on Carrier Aggregation System According to Present Invention As carrier aggregation is applied, if at least one of CA applied cells operates in dynamic change mode for radio resource usage (i.e., named 'eIMTA-enabled cell'), UE operating in fallback mode (i.e., eIMTA UE) on eIMTA-enabled cell can be set to perform UL data channel (PUSCH) (re)transmission based on at least one (i.e., some or all) of Schemes 3-A to 3-C in the following.

3.1. Scheme 3-A

If receiving control/scheduling information (e.g., UL grant and/or PHICH) indicating PUSCH (re)transmission in flexible subframe on eIMTA-enabled SCell, UE operating in fallback mode on the eIMTA-enabled SCell among CA (carrier aggregation) applied cells can be set to omit or drop PUSCH (re)transmission based on the corresponding control/scheduling information. In this case, the present scheme may be set to be limitedly applicable on eIMTA-enabled SCell only. Moreover, the present scheme may be set to be limitedly applicable not to UL grant based initial transmission but to PHICH based retransmission (i.e., non-adaptive retransmission) operation only.

Through the application of the present scheme, it is able to prevent wrong PUSCH piggyback operation of HARQ-ACK generated because actual UL-DL configurations (i.e., UL-DL configuration (re)configured through reconfiguration DCI) assumed between eIMTA-enabled SCell and UE (i.e., eIMTA UE) are different.

For instance, assume a situation as follows. First of all, two cells (i.e., (non-eIMTA) PCell, eIMTA-enabled SCell) are configured for eIMTA UE, for which simultaneous PUCCH/PUSCH transmission is not set, by carrier aggregation. SIB1 UL-DL configuration of (non-eIMTA) PCell is UL-DL configuration #1. SIB1 UL-DL Configuration of eIMTA-enabled SCell and eIMTA DL HARQ Reference Configuration (or, RRC configured DL HARQ Reference Configuration) are set to UL-DL configuration #1 and UL-DL configuration #5, respectively. In this case, in viewpoint of eIMTA-enabled SCell, static UL subframe (fixed UL SF) (i.e., assumed as a location relatively low interference enters from outside) is UL SF#2 and flexible UL subframes (flexible UL SF) (assumed as locations relatively high interference enters from outside) are assumed as UL SF#3, UL SF#7 and UL SF #8. In this case, if cross-carrier scheduling (CCS) is configured, final DL-reference UL/DL Configuration of eIMTA-enabled SCell is determined as UL-DL configuration #1 through Table A in the following. So to speak, in viewpoint of eIMTA-enabled SCell, it means that HARQ-ACK can be transmitted at locations (e.g., UL SF#3, #7, #8) assumed as flexible UL subframes (flexible UL SF) in a manner of being piggybacked on PUSCH (i.e., PUSCH transmitted on SCell).

TABLE A

Per-cell DL-reference UL/DL Configuration driving rules in case that at least one cell operates in eIMTA mode For a UE configured with CA and eIMTA on at least one serving cell, the Rel-10/11 TDD-TDD CA UE behaviors on HARQ-ACK transmission and soft buffer handling and the Rel-12 FDD-TDD CA UE behaviors on HARQ-ACK transmission and soft buffer handling apply, except that the (eIMTA) DL HARQ reference configuration replaces the UL-DL configuration indicated by SIB1 (in case of PCell) and the UL-DL configuration indicated by tdd-Config-r10 (in case of SCell).

TABLE A-continued

Method of driving DL-reference UL/DL Configuration of SCell (Serving Cell) based on Rel-10/11 CA operation DL-reference UL/DL configuration for serving cell based on pair formed by (Primary cell UL/DL configuration, Secondary cell UL/DL configuration)

| Set # | (SIB1 UL-DL Configuration set for PCell, tdd-Config-r10 based UL-DL Configuration set for SCell (Serving Cell)) | DL-reference U/D configuration |
|---|---|---|
| Set 1 | (0, 0) | 0 |
| (Self | (1, 0), (1, 1), (1, 6) | 1 |
| scheduling | (2, 0), (2, 2), (2, 1), (2, 6) | 2 |
| or CCS) | (3, 0), (3, 3), (3, 6) | 3 |
|  | (4, 0), (4, 1), (4, 3), (4, 4), (4, 6) | 4 |
|  | (5, 0), (5, 1), (5, 2), (5, 3), (5, 4), (5, 5), (5, 6) | 5 |
|  | (6, 0), (6, 6) | 6 |
| Set 2 | (0, 1), (6, 1) | 1 |
| (Self | (0, 2), (1, 2), (6, 2) | 2 |
| scheduling) | (0, 3), (6, 3) | 3 |
|  | (0, 4), (1, 4), (3, 4), (6, 4) | 4 |
|  | (0, 5), (1, 5), (2, 5), (3, 5), (4, 5), (6, 5) | 5 |
|  | (0, 6) | 6 |
| Set 3 | (3, 1), (1, 3) | 4 |
| (Self scheduling) | (3, 2), (4, 2), (2, 3), (2, 4) | 5 |
| Set 4 | (0, 1), (0, 2), (0, 3), (0, 4), (0, 5), (0, 6) | 0 |
| (CCS) | (1, 2), (1, 4), (1, 5) | 1 |
|  | (2, 5) | 2 |
|  | (3, 4), (3, 5) | 3 |
|  | (4, 5) | 4 |
|  | (6, 1), (6, 2), (6, 3), (6, 4), (6, 5) | 6 |
| Set 5 | (1, 3) | 1 |
| (CCS) | (2, 3), (2, 4) | 2 |
|  | (3, 1), (3, 2) | 3 |
|  | (4, 2) | 4 |

Although Actual UL-DL Configuration of eIMTA-enabled SCell is set to UL-DL configuration #4 (i.e., RADIO FRAME#N to RADIO FRAME#(N+1) applied), if UE operates in fallback mode because of failing to receive such information, the corresponding assumes Actual UL-DL Configuration of eIMTA-enabled SCell as UL-DL configuration #1.

In this case, if PCell additionally indicates reception success/failure information (i.e., PHICH (i.e., Non-adaptive Retransmission)) on PUSCH (i.e., PUSCH (re)transmitted on eIMTA-enabled SCell), which was (re)transmitted in UL SF#7 of RADIO FRAME #(N−1), in SF#1 of RADIO FRAME #N, PCell and eIMTA-enabled SCell expect that the corresponding UE will transmit HACK-ACKs related to PDSCHs (i.e., PDSCH received on at least one of eIMTA-enabled SCell and PCell) received in DL SF#0 and DL SF#1 by omitting PUSCH (re)transmission in SF#7 of RADIO FRAME#N according to Table B in the following [i.e., because SF#7 of the corresponding RADIO FRAME#N is assumed as DL SF in viewpoints of eIMTA-enabled SCell and PCell].

TABLE B

Method of determining validity of PUSCH (re)transmission related scheduling information in fallback mode Under fallback, if the UE receives a UL grant corresponding to at least one UL subframe per SIB1 not in the set of UL subframes per DL HARQ reference configuration, the UE still treats it as a valid grant.
Under fallback, if the UE receives a NAK in PHICH triggering PUSCH transmission in a UL subframe per SIB1 not in the set of UL subframes per DL HARQ reference configuration, the UE transmits PUSCH.
Method of determining validity of PUSCH (re)transmission related TABLE B-continued scheduling information in case of receiving Reconfiguration DCI successfully If a subframe to be used for PUSCH transmission is changed to a DL subframe according to the L1 reconfiguration DCI, the UE shall not transmit the PUSCH.

Yet, since SF#7 of RADIO FRAME #N is UL SF (i.e., assumed as UL-DL configuration #1) in viewpoint of UE, the corresponding UE assumes that PUSCH (re)transmission is performed in SF#7 of RADIO FRAME #N and then transmits PDSCH related HARQ-ACKs received in DL SF#0 and DL SF#1 by piggybacking on PUSCH (i.e., PUSCH (re)transmitted on eIMTA-enabled SCell) according to Table A. Hence, such operation of the UE may simultaneously cause such problems as HARQ-ACK loss, DL data loss, UE-to-UE Interference and the like.

In case of applying the present scheme 3-A, the UE omits PUSCH (re)transmission in SF#7 of RADIO FRAME #N and transmits PDSCH related HARQ-ACKs received in DL SF#0 and DL SF#1 through PUCCH of PCell, thereby preventing the above-mentioned problems.

3.2. Scheme 3-B

When control/scheduling information (e.g., UL grant and/or PHICH) indicating PUSCH (re)transmission is received in flexible subframe on eIMTA-enabled SCell, UE operating in fallback mode on the eIMTA-enabled SCell among CA (carrier aggregation) applied cells can be set to omit or drop PUSCH (re)transmission only if UCI information (e.g., CSI information, HARQ-ACK information) is piggybacked on the corresponding PUSCH (re)transmission. And, the present scheme 3-B may be set to be limitedly applicable on eIMTA-enabled SCell only. Moreover, the present scheme may be set to be limitedly applicable not to UL grant based initial transmission but to PHICH based retransmission (i.e., non-adaptive retransmission) operation only.

Through the application of the present scheme 3-B, it is able to prevent wrong PUSCH piggyback operation of HARQ-ACK generated because actual UL-DL configurations (i.e., UL-DL configuration (re)configured through reconfiguration DCI) assumed between eIMTA-enabled SCell and UE (i.e., eIMTA UE) are different.

Alternatively, when control/scheduling information (e.g., UL grant and/or PHICH) indicating PUSCH (re)transmission is received in flexible subframe on eIMTA-enabled SCell, UE operating in fallback mode on the eIMTA-enabled SCell among CA (carrier aggregation) applied cells can be set to omit or drop such (re)transmission only if predefined specific UCI information is piggybacked on the corresponding PUSCH (re)transmission. In this case, the corresponding specific UCI information may be defined as HARQ-ACK or CSI (e.g., RI, CQI, PMI).

3.3. Scheme 3-C

At least one of Scheme 3-A and Scheme 3-B may be set to: i) be limitedly applied on a predefined specific cell (e.g., SCell) operating in dynamic change mode for radio resource usage; ii) be limitedly applied to PUSCH retransmission only; or iii) be limitedly applied for a specific retransmission method (e.g., non-adaptive retransmission, adaptive retransmission) only.

The aforementioned embodiments of the present invention may be limitedly applicable to at least one of: i) a case that a dynamic change (eIMTA) mode for radio resource usage is configured; ii) a case that a specific transmission mode is configured; and iii) a case that specific UL-DL configuration is (re)configured.

Furthermore, since the aforementioned embodiments/schemes/settings according to the present invention can be included as one of the implementing methods of the present invention, they can be apparently regarded as one embodiment of the present invention. Although the aforementioned embodiments/schemes/settings according to the present invention may be independently implemented, they may be implemented in a manner of being combined or merged together in part.

Figure 13:
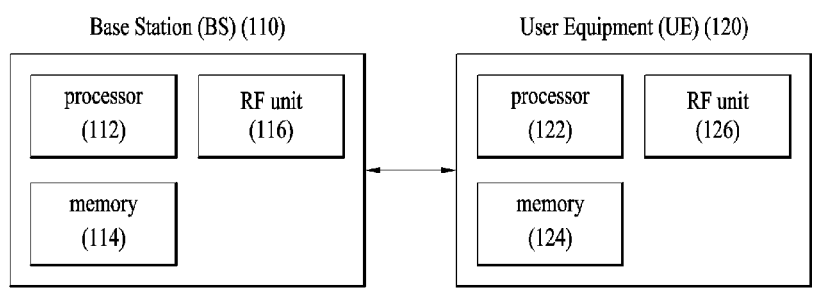
FIG. 13 shows a base station and a user equipment applicable to one embodiment of the present invention.

FIG. 13 shows one example of a base station and a user equipment (UE) applicable to one embodiment of the present invention.

If a relay is included in a wireless communication system, a communication in backhaul link is performed between a base station and a relay. And, a communication in access link is performed between a relay and a user equipment. Hence, the base station or user equipment shown in the drawing can be substituted with a relay in some cases.

Referring to FIG. 13, a wireless communication system includes a base station (BS) 110 and a user equipment (UE) 120. The baser station 110 includes a processor 112, a memory 114, and a Radio Frequency (RF) unit 116. The processor 112 may be configured to perform the proposed procedures and/or methods according to the present invention. The memory 114 is connected to the processor 112 and stores various types of informations related to operations of the processor 112. The RF unit 116 is connected to the processor 112 and transmits and/or receives radio signals. The user equipment 120 includes a processor 122, a memory 124, and an RF unit 126. The processor 122 may be configured to implement the proposed procedures and/or methods according to the present invention. The memory 124 is connected to the processor 122 and stores various information related to operations of the processor 122. The RF unit 126 is connected to the processor 122 and transmits and/or receives radio signals. The baser station 110 and/or the user equipment 120 may have a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The memory unit is provided within or outside the processor to exchange data with the processor through the various means known to the public.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of transmitting an uplink signal in fallback mode in a wireless communication system supportive of reconfiguration of a radio resource and apparatus therefor are described mainly with reference to examples applied to 3GPP LTE system, the present invention is applicable to various kinds of wireless communication systems as well as to the 3GPP LTE system.

What is claimed is:

1. A method of transmitting an uplink signal in a user equipment of a wireless communication system supportive of a dynamic change of radio resource usage, comprising:
   determining uplink signal transmission in a specific subframe on a first uplink-downlink configuration according to a fallback mode,
   wherein the fallback mode is applied if a reception of a reconfiguration message sent for reconfiguration for the radio resource usage according to a second uplink-downlink configuration fails to succeed,
   wherein the specific subframe is designated as at least one of uplink subframes according to SIB1 (system information blocktype1) based uplink-downlink configuration except an uplink subframe according to a downlink HARQ (hybrid automatic repeat and request) reference configuration,
   wherein the uplink signal is configured for PUSCH (physical uplink shared channel) retransmission, and
   signaling an ACK (acknowledge) to an upper layer if a PHICH (physical hybrid-arq indicator channel) indicates the PUSCH retransmission in the specific subframe, wherein the uplink signal is not transmitted and decoding of the PHICH is skipped.

2. The method of claim 1, wherein the uplink signal includes a sounding reference signal (SRS), and wherein the sounding reference signal is dropped if the PUSCH retransmission is not scheduled in the specific subframe.

3. The method of claim 1, wherein the uplink signal is retransmitted in the specific subframe by UL grant based adaptive PUSCH retransmission.

4. The method of claim 3, wherein the specific subframe is configured to drop PHICH based non-adaptive PUSCH retransmission.

5. In transmitting an uplink signal in a wireless communication system supportive of a dynamic change of radio resource usage, a user equipment comprising:
- a radio frequency unit; and
- a processor operatively coupled to the radio frequency unit and is configured to:
- determine uplink signal transmission in a specific subframe on a first uplink-downlink configuration according to a fallback mode,
- wherein the fallback mode is applied if a reception of a reconfiguration message sent for reconfiguration for the radio resource usage according to a second uplink-downlink configuration fails to succeed,
- wherein the specific subframe is designated as at least one of uplink subframes according to SIB1 (system information blocktype1) based uplink-downlink configuration except an uplink subframe according to downlink HARQ (hybrid automatic repeat and request) reference configuration,
- wherein the uplink signal is configured for PUSCH (physical uplink shared channel) retransmission, and
- wherein processor is further configured to signal an ACK (acknowledge) to an upper layer if a PHICH (physical hybrid-arq indicator channel) indicates the PUSCH retransmission in the specific subframe, wherein the uplink signal is not transmitted and decoding of the PHICH is skipped.

6. The user equipment of claim 5, wherein the uplink signal includes a sounding reference signal (SRS), and the sounding reference signal is dropped if the PUSCH retransmission is not scheduled in the specific subframe.

\* \* \* \* \*